United States Patent [19]
Agapiou et al.

[11] Patent Number: 6,090,740
[45] Date of Patent: *Jul. 18, 2000

[54] SUPPORTED METALLOCENE CATALYST SYSTEMS

[75] Inventors: Agapios K. Agapiou, Humble; Dwayne L. Litteer, Baytown; Michael E. Muhle, Kingwood, all of Tex.

[73] Assignee: Exxon Chemical Patents Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,736

[22] Filed: Jan. 23, 1997

Related U.S. Application Data

[63] Continuation of application No. 08/788,736, Jan. 23, 1997
[60] Provisional application No. 60/011,330, Feb. 8, 1996.

[51] Int. Cl.$^7$ .................................. C08F 4/18; C08F 4/64
[52] U.S. Cl. .......................... 502/104; 502/117; 502/120; 502/152; 526/129; 526/160; 526/943
[58] Field of Search ..................................... 502/104, 117, 502/120, 152; 526/129, 160

[56] References Cited

FOREIGN PATENT DOCUMENTS

| 279863 | 8/1988 | European Pat. Off. . |
|---|---|---|
| WO 96/00243 | 1/1996 | WIPO . |
| WO 96/00245 | 1/1996 | WIPO . |
| WO9600243 | 1/1996 | WIPO . |
| WO9600245 | 1/1996 | WIPO . |

*Primary Examiner*—David W. Wu
*Attorney, Agent, or Firm*—C. Paige Schmidt; Anthony R. Chi; Joseph F. Reidy

[57] ABSTRACT

This invention relates generally to supported metallocene catalyst systems and to methods for their production which comprising combining inorganic porous support material having an average particle size of from about $30\mu$ to about $40\mu$, metallocene, and alumoxane wherein the amount of metallocene is in the range of 0.005 to 0.06 mmoles transition metal/g support material and the ratio of aluminum to transition metal is in the range of 10:1 to 300:1. Specifically, this invention relates to supported metallocene catalyst systems having improved metallocene loading and optionally reduced support particle size. These catalyst systems are particularly useful for the polymerization of ethylene polymers.

13 Claims, No Drawings

SUPPORTED METALLOCENE CATALYST SYSTEMS

This is a continuation of application Ser. No. 08/788,736, filed Jan. 23, 1997 which is based on provisional application Serial No. 60/011,330, filed Feb. 8, 1996.

FIELD OF THE INVENTION

This invention relates generally to supported metallocene catalyst systems and to methods for their production and use. Specifically, this invention relates to supported metallocene catalyst systems having improved metallocene loading and optionally reduced support particle size. This invention also relates to the use of these catalyst systems for the polymerization of ethylene polymers.

BACKGROUND

Now that metallocene catalysts are being used for the commercial scale production of polymers, it has become increasingly important to optimize the polymerization process and polymer products. One key variable is the catalyst system itself. Any alteration in the catalyst system formulation which results in increased efficiency, improved productivity, reduced cost, or improved product is extremely valuable. Reducing the amount of metallocene loaded on the support would be expected to result in a reduction in the number of catalyst active sites which would be expected to lead to lower catalyst productivity. We have unexpectedly found, however, that reduction of the metallocene loading not only reduces catalyst cost but actually increases catalyst productivity and improves polymer bulk density. Additionally we have found that using support materials having small particle size improves operability and productivity.

Generally prior art supported metallocene catalyst systems useful for the production of polyethylene use at least 0.06 mmol of metallocene for each gram of support material. The productivity, polymer particle size and bulk density of these catalyst systems is often too low for commercial processes.

WO 9 600 245 describes a method for forming silica supported catalyst systems. In Examples 1–2 Davison 948 silica is used which has an average particle size of from 50–60$\mu$. The ratio of metallocene metal to silica used in the preparation of the catalyst system is 0.069 mmol/g. The catalyst system was tested in a continuous gas phase reactor in the polymerization of ethylene with hexene. The bulk density was 0.426 g/cc and the average particle size was 511$\mu$. The productivity was 1351 g polymer/g catalyst.

WO 9 600 243 describes methods for supporting metallocene catalyst systems for the polymerization of propylene. In the examples, Davison 948 silica is used as are chiral bridged metallocenes useful for the polymerization of isotactic polypropylene. The amount of these highly active metallocenes applied to the support is very low, for example around 0.0187 mmoles Zr/g support. In the examples, propylene was polymerized in a batch slurry reactor. There is no indication of average particle size or bulk density.

It is among the objectives of this invention to provide supported catalyst systems useful for the gas and slurry polymerization of ethylene polymers on a commercial scale with good productivity, low fouling, high bulk density, and optimal particle size. We have surprisingly found that a reduced loading of metallocene on the porous support helps to provide this balance of properties.

SUMMARY

This invention relates to a catalyst system produced by the method comprising: combining porous support material, metallocene, and alumoxane wherein the amount of metallocene that is combined is in the range of from about 0.06 mmoles transition metal/g support material, preferably 0.05 mmoles transition metal/g support material, to about 0.005 mmoles transition metal/g support material and wherein the metallocene is represented by the formula Cp$p$MR$n$X$q$ in which Cp is an unsubstituted or substituted cyclopentadienyl group or derivative thereof, M is zirconium or hafnium, preferably zirconium, and R and X are selected from the group consisting of a halogen atom, hydrogen and an allyl group. In the formula, m+n+q=the valence of M, m is at least one, preferably two, and each of n and q may be 0, 1, 2, or 3. When Cp is substituted, each substituent is preferably a straight or branched chain $C_1$–$C_6$ alkyl group. The cyclopentadienyl group can also be part of a substituted or unsubstituted bicyclic or tricyclic moiety such as indenyl, tetrahydroindenyl, fluorenyl or partially hydrogenated fluorenyl. In one embodiment the metallocene is either not bridged or bridged but achiral.

Particularly preferred metallocenes are those selected from the group consisting of:

bis(cyclopentadienyl)zirconium dichloride, bis(n-butylcyclopentadienyl)zirconium dichloride, bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride,
dimethylsilylbis(tetrahydroindenyl)zirconium dichloride,
dimethylsilylbis(tetrahydroindenyl)zirconium dimethyl,
dimethylsilylbis(indenyl)zirconium dichloride,
dimethylsilyl(bisindenyl)zirconium
dimethyl, dimethylsilylbis(cyclopentadienyl)zirconium dichloride,
dimethylsilylbis(cyclopentadienyl)zirconium dimethyl and (n-propyl cyclopentadienyl, pentamethyl cyclopentadienyl)zirconium dimethyl.

This invention also relates to a method for preparing a supported metallocene catalyst system, said method comprising combining porous support material, metallocene, and alumoxane wherein the amount of metallocene is in the range of from about 0.06, preferably 0.05, mmoles transition metal/g support material to about 0.005 mmoles transition metal/g support material, and wherein the metallocene is as described above.

This invention also relates to a method for the polymerization of ethylene polymers, preferably the continuous gas phase or slurry phase polymerization of ethylene polymers, said method comprising: contacting a supported catalyst system with ethylene, optionally with comonomers, under suitable polymerization conditions wherein the catalyst system is prepared by the process comprising combining porous support material, metallocene, and alumoxane, wherein the amount of metallocene is in the range of from about 0.06, preferably 0.05, mmoles transition metal/g support material to about 0.005 mmoles transition metal/g support material and wherein the amount of alumoxane is in the range of from about 10 mmols Al/g support material to about 3 mmols Al/g support material, and wherein the catalyst system productivity is greater than about 1500 g polymer/g catalyst, preferably greater than about 2000 g polymer/g catalyst. By this method, ethylene polymer may be recovered having an average particle size of from about 600µ, preferably about 700µ to about 2000µ.

DETAILED DESCRIPTION

Catalyst System Components

Metallocenes

Generally three components make up the catalyst systems of this invention; one or more metallocenes, activator and porous support material. As used herein "metallocene" refers generally to compounds represented by the formula $Cp_mMR_nX_q$ wherein $C_p$ is a substituted or unsubstituted cyclopentadienyl ring or a derivative thereof, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Preferred metallocenes are those represented by the formula Cp$m$MR$n$X$q$ wherein Cp is an unsubstituted or substituted cyclopentadienyl group or derivative thereof, M is zirconium or hafnium, preferably zirconium, and R and X are selected from the group consisting of a halogen atom, hydrogen and an alkyl group. In the formula, m+n+q=the valence of M, m is at least one, preferably two, and each of n and q may be 0, 1, 2, or 3. When Cp is substituted, each substituent is preferably a straight or branched chain $C_1$–$C_6$ alkyl group. The cyclopentadienyl group can also be part of a substituted or unsubstituted bicyclic or tricyclic moiety such as indenyl, tetrahydroindenyl, fluorenyl or partially hydrogenated fluorenyl. In one embodiment the metallocene is either not bridged or if bridged, then achiral. Particularly preferred metallocenes are those selected from the group consisting of:

bis(cyclopentadienyl)zirconium dichloride, bis(n-butylcyclopentadienyl)zirconium dichloride, bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride,
and (n-propyl cyclopentadienyl, pentamethyl cyclopentadienyl)zirconium dimethyl Methods of making and using metallocenes are very well known in the art. For example, metallocenes are discussed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

Activators

Metallocenes are generally used in combination with some form of activator in order to create an active catalyst system. The term "activator" is defined herein to be any compound or component capable of enhancing the ability of one or more metallocenes to polymerize olefins to polyolefins. Alklyalumoxanes are preferably used as activators, most preferably methylalumoxane (MAO). Generally, the alkylalumoxanes contain about 5 to 40 of the repeating units:

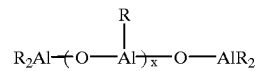

for linear species and

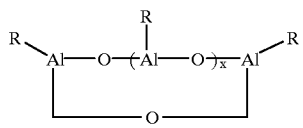

for cyclic species
where R is a $C_1$–$C_8$ alkyl including mixed alkyls. Particularly preferred are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952, 540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each fully incorporated herein by reference.

Some MAO solutions tend to become cloudy and gelatinous over time. It may be advantageous to clarify such solutions prior to use. A number of methods are used to create gel-free MAO solutions or to remove gels from the solutions. Gelled solutions are often simply filtered or decanted to separate the gels from the clear MAO. U.S. Pat. No. 5,157,137 discloses a process for forming clear, gel-free solutions of alkylalumoxane by treating a solution of alkylalumoxane with an anhydrous salt and/or hydride of an alkali or alkaline earth metal. Alternatively, the alumoxane may be combined with metallocene a number of days prior to use. It has been found that the metallocene stabilizes the alumoxane and reduces its tendency to form gels.

Support Materials

The catalyst systems of this invention are supported on a porous support material. Likewise, the method of this invention involves supporting metallocene and alumoxane on the support material. Preferably, the support material is a porous particulate material, such as talc, inorganic oxides, inorganic chlorides and resinous materials such as polyolefin or polymeric compounds. Such materials are generally commercially available.

The preferred support materials are porous inorganic oxide materials, which include those from the Periodic Table of Elements of Groups 2, 3, 4, 5, 13 or 14 metal oxides. Silica, alumina, silica-alumina, and mixtures thereof are most preferred. Other inorganic oxides that may be employed either alone or in combination with the silica, alumina or silica-alumina, are magnesia, titania, zirconia, magnesium chloride and the like.

Preferably the support material is porous silica which has a surface area in the range of from about 50 to about 500 $m^2/g$, a total pore volume in the range of from about 0.5 to about 5.0 cc/g and an average particle size in the range of from about $5\mu$ to about $150\mu$. More preferably, the surface area is in the range of from about 100 to about 400 $m^2/g$, the pore volume is in the range of from about 1.0 to about 2.5 cc/g and the average particle size is in the range of from about $20\mu$ to about $70\mu$. Most preferably the surface area is in the range of from about 250 to about 350 $m^2/g$, the pore volume is in the range of from about 1.5 to 2.0 cc/g, and the average particle size is in the range of from about $30\mu$ to about $50\mu$.

Preferably the support material is at least partially dehydrated. It is particularly desirable to dehydrate the silica at a temperature of from about 200° C. to about 800° C., preferably from about 500° C. to about 800° C. for anywhere from about 2 to about 24 hours, preferably from about 5 to about 15 hours.

Methods of Making the Catalyst Systems

The metallocene, alumoxane, and support material may be combined in any manner, however, preferably the metallocene and alumoxane are combined together and their reaction product then added to the support material.

The preferred amount of metallocene added to the support is in the range of from about 0.06 mmol transition metal/gram of support to about 0.005 mmol transition metal/gram of support, more preferably from about 0.05 mmol transition metal/gram of support to about 0.008 mmol transition metal/gram of support, even more preferably from about 0.045 mmol transition metal/gram of support to about 0.01 mmol transition metal/gram of support, and most preferably from about 0.04 mmol transition metal/gram of support to about 0.01 mmol transition metal/gram of support.

The preferred amount of alumoxane added to the support is in the range of from about 10.0 mmol Al/gram of support to about 1.0 mmol Al/gram of support, even more preferably from about 9.0 mmol Al metal/gram of support to about 4.0 mmol Al/gram of support, even more preferably of from about 8.0 mmol Al/gram of support to about 5.0 mmol Al/gram of support, and most preferably from about 7.0 mmol Al/gram of support to about 5.0 mmol Al/gram of support.

Preferably the mole ratio of the aluminum of the alumoxane component to the transition metal of the metallocene component applied to the support is in the range of ratios between about 10:1 to about 400:1, more preferably about 40:1 to about 300:1, and most preferably from about 50:1 to about 200:1.

Preferably, the metallocene and alumoxane are added to the support while they are in solution. As used herein "solution" refers to any type of mixture including slurries and suspensions. It is most preferable to combine the metallocene and alumoxane in solution prior to combination with the support. The total volume of solution added to dry support at any one time is preferably in the range of from about 1.5 to about 3.5 times the total pore volume of the porous support, preferably from about 2.0 to about 3.0 times the total pore volume of the porous support and most preferably about 2.5 times the total pore volume of the porous support.

The procedure for measuring the total pore volume of a porous support or catalyst system is well known in the art. Details of one of these procedures are discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration*, Vol. 28, No. 3, Analytical Chemistry 332–334 (March, 1956).

Regardless of the amount of solution used, it is advantageous to combine the silica and solution such that the solution is evenly distributed on and within the porous silica particles. Thus it is preferable to add the solution to the silica slowly or drop-wise while the silica is mixed.

Any compatible solvent may be used to form the solutions. Non-limiting examples of solvents are aliphatic, aromatic and saturated hydrocarbons, and cyclic hydrocarbons such as isopentane, heptane, toluene, and the like. The more preferred solvents are the cyclic aliphatic and aromatic hydrocarbons such as cyclohexane and toluene.

After the metallocene and activator are combined with the support, the catalyst system is preferably dried at least to the point at which the catalyst system becomes a free flowing powder. Heat and/or vacuum may be used to dry the catalyst. Typically vacuum about 0 to about 7 atm and temperature of from about 25° C. to about 100° C. is used for a time period ranging from about 4 to about 36 hours.

The dried catalyst system preferably has a transition metal loading in the range of from about 0.40 to about 0.02 weight percent based on the total weight of the catalyst system, preferably from about 0.35 to about 0.05 weight percent based on the total weight of the catalyst system, more preferably from about 0.30 to about 0.10 weight percent and most preferably from about 0.25 to about 0.10 weight percent based on the total weight of the dry catalyst system. The final aluminum loading is preferably in the range of from about 8 to about 15 weight percent based on the total weight of the dry catalyst system.

A surface modifier is preferably used in the preparation of the present invention. Suitable surface modifiers include poly alcolhols or tertiary fatty amines of the formula $CH_3(CH)_nCH_2$—$N(CH_2CH_2OH)_2$ such as AS-990 available from Witco. Preferably about 7 mgs/g support of surface modifier is used and about 0.15 cc/g support of surface modifier solution is added to the catalyst system prior to drying the catalyst system.

The catalyst systems of this invention may be used directly in polymerization or they may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

The catalyst system of this invention may be used in the polymerization of any monomer and optionally comonomers in any process including gas, slurry or solution phase, high pressure tubular or autoclave processes. (As used herein, unless differentiated, "polymerization," includes copolymerization and terpolymerization, "monomer" includes comonomer and termonomer and "polymer" includes copolymers and terpolymers.) Preferably, a continuous gas or slurry phase process is used. Most preferably a continuous gas phase process is used and preferably ethylene polymer is polymerized.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of about 1 to about 100 atmospheres or even greater and temperatures in the range of –60° C. to about 110° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid or supercritical under the conditions of polymerization and relatively inert. Non-limiting examples of liquid mediums include hexane, isobutane, propane, isohexane and isopentane.

A scavenger may be used during polymerization, however, the process of the invention does not require a scavenger and the use of a scavenger may be detrimental. Non-limiting examples of scavenger compounds include for example, triethylaluminum (TEAL), trimethylaluminum (TMAL), tri-isobutylaluminum (TIBAL), tri-n-hexylaluminum (TNHAL), diethyl aluminum chloride (DEAC), tri-n-octyl aluminum (TNOCTAL) and the like, as well as a diethylzinc (DEZ).

The catalyst systems of this invention preferably have a productivity of more than about 1000 g polymer/g catalyst, preferably more than about 1500 g polymer/g catalyst, even more preferably from about 2000 g polymer/g catalyst to about 10,000 g polymer/g catalyst, most preferably from about 4000 g polymer/g catalyst to about 8000 g polymer/g catalyst.

The polymer product is preferably an ethylene based polymer having an average particle size of from about 500μ to about 2000μ, preferably from about 600μ to about 1500μ, even more preferably from about 700μ to about 1000. The bulk density is preferably greater than about 0.350 g/cc. Preferably from about 0.400 to about 0.500 g/cc.

If the polymer product is an ethylene copolymer, preferably the polymer is comprised of 50 weight percent or more of ethylene units, even more preferably from about 80 to 100 weight percent ethylene, and most preferably from about 90 to 100 weight percent ethylene based on the total weight of the polymer.

EXAMPLES

Polymer properties were determined by the following test methods:

Bulk Density

The resin is poured via a 2.2 cm (⅞ inch) diameter funnel into a fixed volume cylinder of 400 cc. The bulk density is measured as a weight of resin divided by 400 cc to give a value in g/cc.

Particle Size

The particle size is measured by determining the weight of material collected on a series of U.S. Standard sieves and determining the weight average particle size based on the sieve series used.

Effect of Silica Size

Example 1

10 cc of toluene, 6.2 grams of a 30 weight percent methylaluminoxane solution in toluene (Albemarle Corp.) (32 mmol Al.) and 0.144 grams of bis(1-methyl,3-n-butylcyclopentadienyl)zirconium dichloride (0.333 mmol Zr) (Albemarle Corp.). were combined in a glass vial (A). The mixture was stirred at room temperature for 5 min.

5 grams of 600° dehydrated silica (Davison grade 952X) having an average particle size (APS) of between 30–40 micron (1.5–1.6 cc/g pore volume) was weighed in a separate vial (B). While stirring, the content of vial A was slowly added to the silica in vial B. Toluene (2.3 cc) was used to rinse vial A and the rinse was added to vial B. While stirring the silica slurry, 2.0 cc of toluene solution containing 3.6 mgs. of AS-990 (Witco) was added and stirring was continued for 10 more minutes. The final slurry consistency was 4.18 cc of liquid per gram of silica. The toluene was then evaporated from the slurry at 75° C. with a nitrogen purge until the catalyst was free flowing.

In a clean nitrogen purged 1.2 lt. autoclave was added 800 cc dry and oxygen free isobutane followed by the addition of 0.3 cc of 1.25 molar solution of TEAL in hexane. With stirring 60 cc of 1-hexene was added and the mixture was brought up to 85° C. Catalyst (100 mg) was then added to the reactor via the ethylene injector port and the total pressure adjusted and maintained at 325 psi on demand. Polymerization was allowed to proceed for 40 minutes and was monitored by the ethylene uptake curve. Polymerization was terminated by interrupting the heat and quickly venting the contents of the reactor. The polymer was dried overnight in a vacuum oven and weighed. The results of the polymerization are shown in Table 1.

Example 1—Comparative

The catalyst was prepared similarly to the one described in Example 1 the difference being that the silica used was Davison's 948 grade silica with an APS of 50–60μ (pore volume of 1.6 cc/g). This catalyst was also evaluated in an isobutane slurry batch polymerization reactor as described in Example 1. The results are shown in Table 1.

Example 2

10 cc of toluene, 4.96 grams of a 30 weight percent methylaluminoxane solution in toluene (Albemarle Corp.) (25.7 mmol Al) and 0.096 g of bis(1-methyl,3-n-butylcyclopentadienyl)zirconium dichloride (0.225 mmol Zr) (Albemarle Corp.) were combined in a glass vial (A). The mixture was stirred at room temperature for 5 minutes.

In a separate vial (B), 5 grams of silica (Davison grade 952X) having an average particle size (APS) of between 30–40 micron was weighed. While stirring, the content of vial A was slowly added to the silica in vial B. Toluene (2.3 cc) was used to rinse vial A and the rinse added to vial B. While stirring the silica slurry, 2.0 cc of toluene solution containing 3.6 mgs. of AS-990 (Witco) was added and stirring was continued for 10 more minutes. There were 4.15 cc of liquid per gram of silica. The toluene was then evaporated from the slurry at 75° C. with nitrogen purge until the catalyst was free flowing. This catlayst was used in polymerization as conducted in Example 1. The results are shown in Table 1.

Example 2—Comparative

The catalyst was prepared similarly to the one described in Example 2, the difference being that the silica used in Comparative Example 2 was Davison's grade 948 with an APS of 50–60 microns. This catalyst was also evaluated in an isobutane slurry batch polymerization reactor as described in Example 1. The polymerization performance is shown in Table 1.

As can be seen in Table 1, the productivity of the catalysts made on the smaller APS (3040 micron) silica is higher than for the catalyst made on 50–60 micron APS silica.

Effect of Metallocene Loading on Silica

Example 3

Into a 2 gal. vessel equipped with an agitator were added 0.934 kg of a 30 wt % MAO solution in toluene (4.83 mol Al) 1.48 kg of purified toluene and 120 cc of a toluene solution containing 11.6 g of bis(methyl, 3-n-butylcyclopentadienyl) zirconium dichloride (0.027 mol Zr). The mixture was stirred for 1 hour at room temperature after which it was unloaded into a container under a nitrogen atmosphere.

0.80 kg of Davison 948 silica having an APS of 50–60 micron and dehydrated to 600° C. was put in a dry 2 gal. reactor. While stirring, the MAO/zirconocene toluene solution prepared above, was slowly added to the reactor containing the silica. The mixture was stirred for 20 minutes after which 450 cc of toluene was added and stirring was continued for an additional 20 minutes. A mixture 5.6 g of AS-990 and 50 cc of toluene were then added to the reactor and mixed for 30 minutes. The total volume of solution applied to the support was 4.10 cc/g. Drying of the slurry was then started at 79° C. with a nitrogen purge until the catalyst was free flowing. The catalyst was cooled down, unloaded and tested.

The polymerization was conducted in a continuous gas phase fluidized bed reactor. The fluidized bed is made up of polymer granules. The gaseous feed streams of ethylene and hydrogen were mixed together in a mixing tee arrangement and introduced below the reactor bed into the recycle gas line. Hexene was used as a comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst prepared above was injected directly into the fluidized bed using purified nitrogen as a carrier. Its rate was adjusted to maintain a constant production rate of from about 20–100 kg/hr. The reacting bed of growing polymer particles is maintained in a fluidized state by the continuous flow of the make up feed and recycle gas through the reaction zone. A superficial gas velocity of 0.3–1.0 m/s (1–3 ft/sec.) was used to achieve this. The reactor was operated at a total pressure of 21 atm. (300 psig). To maintain a constant reactor temperature, the temperature of the recycle gas is continuously adjusted up or down to accommodate any changes is the rate of heat generation due to the polymerization.

The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of product, while at the same time recycling a large portion of the unreacted gases back to the reactor. This product is purged to remove entrained hydrocarbons and treated with a small steam of humidified nitrogen to deactivate any trace quantities of residual catalyst. The results are shown in Table 2.

Example 4

Into a 2 gal. vessel equipped with an agitator were added 0.934 kg of a 30 wt % MAO solution in toluene (4.83 mol Al), 0.934 kg of purified toluene and 180 cc of a toluene solution containing 17.4 g of bis(1-methyl, 3-n-butylcyclopentadienyl zirconium) dichloride (0.40 mol Zr). The mixture was stirred for 1 hour at room temperature after which it was unloaded into a container under a nitrogen atmosphere.

0.80 kg of Davison 948 silica having an APS of 50–60 micron and dehydrated to 600° C. was put into a dry 2 gal. reactor. While stirring, the MAO/zirconocene toluene solution prepared above, was slowly added to the reactor containing the silica. The mixture was stirred for 20 minutes after which 450 cc of toluene was added and stirring was continued for an additional 20 minutes. A mixture 5.6 g of AS-990 and 50 cc of toluene was then added to the reactor and mixed for 30 minutes. The total volume of liquid applied to the silica was 4.10 cc/g. Drying of the slurry was then started at 79° C. with a Nitrogen purge until the catalyst was free flowing. The catalyst was cooled down, unloaded and tested. The polymerization was conducted as in Example 3. The results are shown in Table 2.

Example 5—Comparative

Into a 2 gal. vessel equipped with an agitator were added 1.1 kg of a 30 wt. % MAO solution in toluene (5.69 mol Al), 1.63 kg of purified toluene and 240 cc of a toluene solution containing 27.5 g of bis(1-methyl, 3-n-butylcyclopentadienyl) zirconium dichloride (0.064 mol Zr). The mixture was stirred for 1 hour at room temperature after which it was unloaded into a container under nitrogen atmosphere.

0.95 kg of Davison 948 silica having an APS of 50–60 micron and dehydrated to 600° C. was put into a dry 2 gal. reactor. While stirring, the MAO/zirconocene toluene solution prepared above, was slowly added to the reactor containing the silica. The mixture was stirred for 20 minutes after which 530 cc of toluene was added and stirring was continued for an additional 20 minutes. A mixture of 6.7 g of AS-990 and 50 cc of toluene were then added to the reactor and mixed for 30 minutes. The total amount of liquid applied to the silica was 4.10 cc/g. Drying of the slurry was then started at 79° C. with a nitrogen purge until the catalyst was free flowing. The catalyst was cooled down, unloaded and tested. The polymerization was conducted as in Example 3. The results are shown in Table 2.

As can be seen in Table 2, the resin bulk density increases with decreasing the weight percent of the Zr on the catalyst (from 0.387 to 0.430 g/cc). At the same time, the catalyst productivity increases as the Zr weight percent decreases going through a maximum of 4866 gPE/gcat at 0.050 mmoles Zr/g $SiO_2$ loading. These results unexpectedly show there is an optimum loading of Zr for a good balance of productivity and resin bulk density.

Example 6—Comparative

Into a glass vial (A) was added 10 cc of toluene, 6.2 g of a 30 wt. % MAO solution in toluene (Albemarle Corp.) (32 mmol Al) and 0.144 g of bis(1-methyl,3-n-butylcyclopentadienyl)zirconium dichloride (Albemarle Corp.) (0.335 mmol Zr). The mixture was stirred at room temperature for 5 min.

In a separate vial (B), 5 g of 600° C. dehydrated silica (Davison grade 948) having an APS of between 50–60 micron were weighed. While stirring, the content of vial A was slowly added to the silica in vial B. Toluene (2.3 cc) was used to rinse vial A and the rinse was added to vial B. While stirring the silica slurry, 2.0 cc of toluene solution containing 3.6 mgs. of AS-990 (Witco) was added and stirring was continued for 10 more minutes. The total amount of liquid added to the silica was 4.10 cc/g. The toluene was then evaporated from the slurry at 75° C. with a nitrogen purge until the catalyst was free flowing. Polymerization was conducted as in Example 1. The results are shown in Table 3.

Example 7

Into a glass vial (A) was added 10 cc of toluene, 6.2 g of a 30 wt. % MAO solution in toluene (Albemarle Corp.) (32 mmol Al) and 0.072 g of bis(1,3-methyl,n-butylcyclopentadienyl)zirconium dichloride (Albemarle Corp.) (0.168 mmol Zr). The mixture was stirred at room temperature for 5 min.

In a separate vial (B), 5 g of 600° C. dehydrated silica (Davison grade 948) having an APS of between 50–60$\mu$ was weighed. While stirring, the content of vial A was slowly added to the silica in vial B. Toluene (2.3 cc) was used to rinse vial A and the rinse was added to vial B. While stirring the silica slurry, 2.0 cc of toluene solution containing 3.6 mgs. of AS-990 (Witco) was added and stirring was continued for 10 more minutes. The total amount of liquid added to the silica was 4.10 cc/g. The toluene was then evaporated from the slurry at 75° C. with a nitrogen purge until the catalyst was free flowing. The polymerization was conducted as in Example 1. The results are shown Table 3.

Example 8

Into a glass vial (A) was added 10 cc of toluene, 4.65 g of a 30 wt % MAO solution in toluene (Albemarle Corp.) (24 mmol Al) and 0.108 g of bis(1-methyl,3-n-butylcyclopentadienyl)zirconium dichloride (Albemarle Corp.) (0.250 mmol Zr). The mixture was stirred at room temperature for 5 min.

5 g of 600° C. dehydrated silica (Davison grade 948) having an APS of between 50–60$\mu$ was weighed in a separate vial (B). While stirring, the content of vial A was slowly added to the silica in vial B. Toluene (2.3 cc) was used to rinse vial A and the rinse was added to vial B. While stirring the silica slurry, 2.0 cc of toluene solution containing 3.6 mgs. of AS-990 (Witco) was added and stirring was continued for 10 more minutes. The total amount of liquid added to the silica was 4.10 cc/g. The toluene was then evaporated from the slurry at 75° C. with a nitrogen purge until the catalyst was free flowing. The polymerization was conducted as in Example 1. The results are shown in Table 3.

Example 9

10 cc of toluene was added to a glass vial (A) along with 3.1 g of a 30 wt % MAO solution in toluene (Albemarle Corp.) (16.0 mmol Al) and 0.072 g of bis(1-methyl,3-n-butylcyclopentadienyl)zirconium dichloride (Albemarle Corp.) (0.034 mmol Zr). The mixture was stirred at room temperature for 5 min.

5 g of 600° C. dehydrated silica (Davison grade 948) having an APS of between 50–60$\mu$ was weighed in a separate vile (B). While stirring, the content of vial A was slowly added to the silica in vial B. Toluene (2.3 cc) was used to rinse vial A and the rinse was added to vial B. While stirring the silica slurry, 20 cc of toluene solution containing 3.6 mgs. of AS-990 (Witco) was added and stirring was continued for 10 more minutes. The total amount of liquid added to the silica was 4.10 cc/g. The toluene was then evaporated from the slurry at 75 ° C. with a nitrogen purge until the catalyst was free flowing. The polymerization was conducted as in Example 1. The results are shown in Table 3.

Example 10

10 cc of toluene was added to a glass vial (A) along with 4.65 g of a 30 wt % methylaluminoxane solution in toluene (Albemarle Corp.) (24 mmol Al) and 0.072 g of bis(1-methyl,3-n-butylcyclopentadienyl)zirconium dichloride (Albemarle Corp.) (0.034 mmol Zr). The mixture was stirred at room temperature for 5 min.

5 g of 600° C. dehydrated silica (Davison grade 948) having an APS of between 50–60$\mu$ was weighed in a separate vial (B). While stirring, the content of vial A was slowly added to the silica in vial B. Toluene (2.3 cc) was used to rinse vial A and the rinse was added to vial B. While stirring the silica slurry, 2.0 cc of toluene solution containing 3.6 mgs. of AS-990 (Witco) was added and stirring was continued for 10 more minutes. The total amount of liquid added to the silica was 4.10 cc/g. The toluene was then evaporated from the slurry at 75° C. with a nitrogen purge until the catalyst was free flowing. The polymerization was conducted as in Example 1. The results are shown in Table 3.

Example 11

The catalyst was prepared as in Example 7 except that the metallocene used was bis-(n-butylcyclopentadienyl) zirconium dichloride. The polymerization conditions were the same as in Example 1. The results are shown in Table 4.

Example 12

The catalyst was prepared as in Example 8 except that the metallocene used was bis-(n-butylcyclopentadienyl) zirconium dichloride. The polymerization conditions were the same as in Example 1. The results are shown in Table 4.

Example 13

The catalyst was prepared as in Example 11 except that the metallocene used was bis-(n-butylcyclopentadienyl) zirconium dichloride. The polymerization conditions were the same as in Example 1. The results are shown in Table 4.

Example 14

The catalyst was prepared as in example 10 except that the metallocene used was bis-n-butylcyclopentadienyl zirconium dichloride. The polymerization conditions were the same as in Example 1. The results are shown in Table 4.

Example 15—Effect of Reducing the Metallocene Loading and Support Particle Size Into a 2 gal. vessel equipped with an agitator were added 1.30 Kg of a 30 wt. % MAO solution in toluene (6.72 moles Al) and 1.74 kg of purified toluene and 200 cc of a toluene solution containing 20.1 g of bis(1-methyl, 3-n-butylcyclopentadienyl) zirconium dichloride (0.047 moles Zr). The mixture was stirred for 1 hour at room temperature after which it was unloaded into a container under a nitrogen atmosphere.

1.04 kg of Davison 952X silica having an APS of 30–40 micron and dehydrated to 600° C. was put into a dry 2 gal reactor. While stirring, the MAO/zirconocene toluene solution prepared above, was slowly added to the reactor containing the silica. The mixture was stirred for 20 minutes after which 450 cc of toluene was added and stirring was continued for an additional 20 minutes. A mixture of 7.5 g of AS-990 and 75 cc of toluene was then added to the reactor and mixed for 30 minutes. The total amount of liquid added to the silica was 4.10 cc/g. Drying of the slurry was then started at 68° C. with a Nitrogen purge until the catalyst was free flowing. The catalyst was cooled down, unloaded and tested. The polymerization was conducted as in Example 3. Results are shown in Table 5.

Example 15—Comparative

Into a 2 gal. vessel equipped with an agitator were added 1.1 kg of a 30 wt. % MAO solution in toluene (5.69 mol Al), 1.63 kg of purified toluene and 240 cc of a toluene solution containing 27.5 g of bis(1,-methyl, 3-n-butylcyclopentadienyl) zirconium dichloride (0.064 mol Zr). The mixture was stirred for 1 hour at room temperature after which it was unloaded into a container under nitrogen atmosphere.

0.95 kg of Davison 948 silica having an APS of 3040 micron and dehydrated to 600° C. was put into a dry 2 gal. reactor. While stirring, the MAO/zirconocene toluene solution prepared above, was slowly added to the reactor containing the silica. The mixture was stirred for 20 minutes after which 530 cc of toluene was added and stirring was continued for an additional 20 minutes. A mixture of 6.7 g of AS-990 and 50 cc of toluene were then added to the reactor and mixed for 30 minutes. The total amount of liquid applied to the silica was 4.10 cc/g. Drying of the slurry was then started at 79° C. with a nitrogen purge until the catalyst was free flowing. The catalyst was cooled down, unloaded and tested. The polymerization was conducted as in Example 3. The results are shown in Table 5.

TABLE 1

| Catalyst | Silica Size ($\mu$) | Yield (g) | Productivity (gPE/gCat) | Resin BD (g/cc) |
|---|---|---|---|---|
| Example 1 | 30–40 | 164 | 2460 | — |
| Comparative Example 1 | 50–60 | 121 | 1815 | — |
| Example 2 | 30–40 | 133 | 1995 | 0.404 |
| Comparative Example 2 | 50–60 | 113 | 1695 | 0.385 |

TABLE 2

| Catalyst | Final Al (wt %) | Final Zr (wt %) | Resin Bulk Density (g/cc) | MAO Loading (mmol Al/g silica) | MCN Loading (mmol Zr/g silica) | Productivity (g PE/g cat.) | Resin APS ($\mu$) |
|---|---|---|---|---|---|---|---|
| Example 3 | 12.6 | 0.20 | 0.430 | 6.0 | 0.034 | 3955 | 986 |
| Exmaple 4 | 13.2 | 0.30 | 0.407 | 6.0 | 0.050 | 4877 | 978 |
| Example 5 Comparative | 12.1 | 0.41 | 0.378 | 6.0 | 0.067 | 4065 | 928 |

TABLE 3

| Example | Silica APS ($\mu$) | MAO Loading (mmolAl/g silica) | MCN Loading (mmolZr/g silica) | Productivity (gPE/g cat.) | Bulk Density (g/cc) |
|---|---|---|---|---|---|
| 6 Comparative | 50–60 | 6.4 | 0.067 | 2190 | 0.402 |
| 7 | 50–60 | 6.4 | 0.034 | 2445 | 0.434 |
| 8 | 50–60 | 4.8 | 0.05 | 2085 | 0.349 |
| 9 | 50–60 | 3.2 | 0.034 | 1650 | 0.330 |
| 10 | 50–60 | 4.8 | 0.034 | 2055 | 0.366 |

TABLE 4

| Example | Silica APS (µ) | MAO Loading (mmolAl/g silica) | MCN Loading (mmolZr/g silica) | Productivity (gPE/g cat.) | Bulk Density (g/cc) |
|---|---|---|---|---|---|
| 11 Comparative | 30–40 | 6.4 | 0.067 | 2295 | 0.393 |
| 12 | 50–60 | 6.4 | 0.034 | 3135 | 0.413 |
| 13 | 50–60 | 4.8 | 0.034 | 3000 | 0.340 |
| 14 | 50–60 | 3.2 | 0.034 | 2580 | 0.319 |

TABLE 5

| Example | Silica APS (µ) | MAO Loading (mmol Al/g silica) | MCN Loading (mmol Zr/g silica) | Productivity (p PE/g cat.) | Bulk Density (g/cc) | Resin APS (µ) |
|---|---|---|---|---|---|---|
| 15 Comparative | 50–60 | 6.4 | 0.067 | 4580 | 0.419 | 873 |
| 15 | 30–40 | 6.4 | 0.045 | 5536 | 0.453 | 786 |

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

We claim:

1. A method for preparing a supported metallocene catalyst system, said method comprising combining inorganic porous support material having an average particle size of from about 30µ to about 40µ, metallocene, and alumoxane wherein the amount of metallocene is in the range of from 0.06 mmoles transition metal/g support material to about 0.005 mmoles transition metal/g support material, wherein the ratio of the aluminum from the alumoxane component to the transition metal of the metallocene component applied to the support is in the range between about 10:1 to about 300:1, and wherein the metallocene comprises an unbridged or achiral bridged component represented by the formula $Cp_mMR_nX_q$ wherein Cp is an unsubstituted or substituted cyclopentadienyl groups, M is zirconium or hafnium, and R and X are selected from the group consisting of a halogen atom hydrogen and an alkyl group, m+n+q=the valence of M, m is at least one and each of n and q equals 0, 1, 2, or 3.

2. The method of claim 1 wherein the amount of metallocene is in the range of from about 0.045 mmoles transition metal/g support material to about 0.01 mmoles transition metal/g support material.

3. The method of claim 1 wherein the amount of metallocene is in the range of from about 0.04 mmoles transition metal/g support material to about 0.01 mmoles transition metal/g support material.

4. The method of claim 1 wherein the support comprises silica.

5. The method of claim 2 wherein the metallocene is not bridged.

6. The method of claim 1 wherein the metallocene and alumoxane are combined prior to combination with the support material.

7. The method of claim 1 further comprising the step of drying the catalyst system.

8. The method of claim 1 wherein the metallocene and alumoxane are either separately or together in a solution, said solution having a total volume that is in the range of from about 2.0 times the total pore volume of the porous support to about 3.0 times the total pore volume of the porous support.

9. The method of claim 1 wherein the amount of alumoxane is in the range of from about 9.0 mmoles aluminum/g support material to about 4.0 mmoles aluminum/g support material.

10. The method of claim 1 wherein the metallocene is selected from the group consisting of:

bis(cyclopentadienyl)zirconium dichloride, bis(n-butylcyclopentadienyl)zirconium dichloride, bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride,
and (n-propyl cyclopentadienyl, pentamethyl cyclopentadienyl)zirconium dimethyl.

11. The method of claim 1 wherein the support material is silica or alumina.

12. The method of claim 1 wherein the alumoxane is methylalumoxane.

13. The method of claim 1 wherein the amount of metallocene is in the range of from about 0.05 mmoles transition metal/g support material to about 0.008 mmoles transition metal/g support material.

* * * * *